Patented Nov. 20, 1934

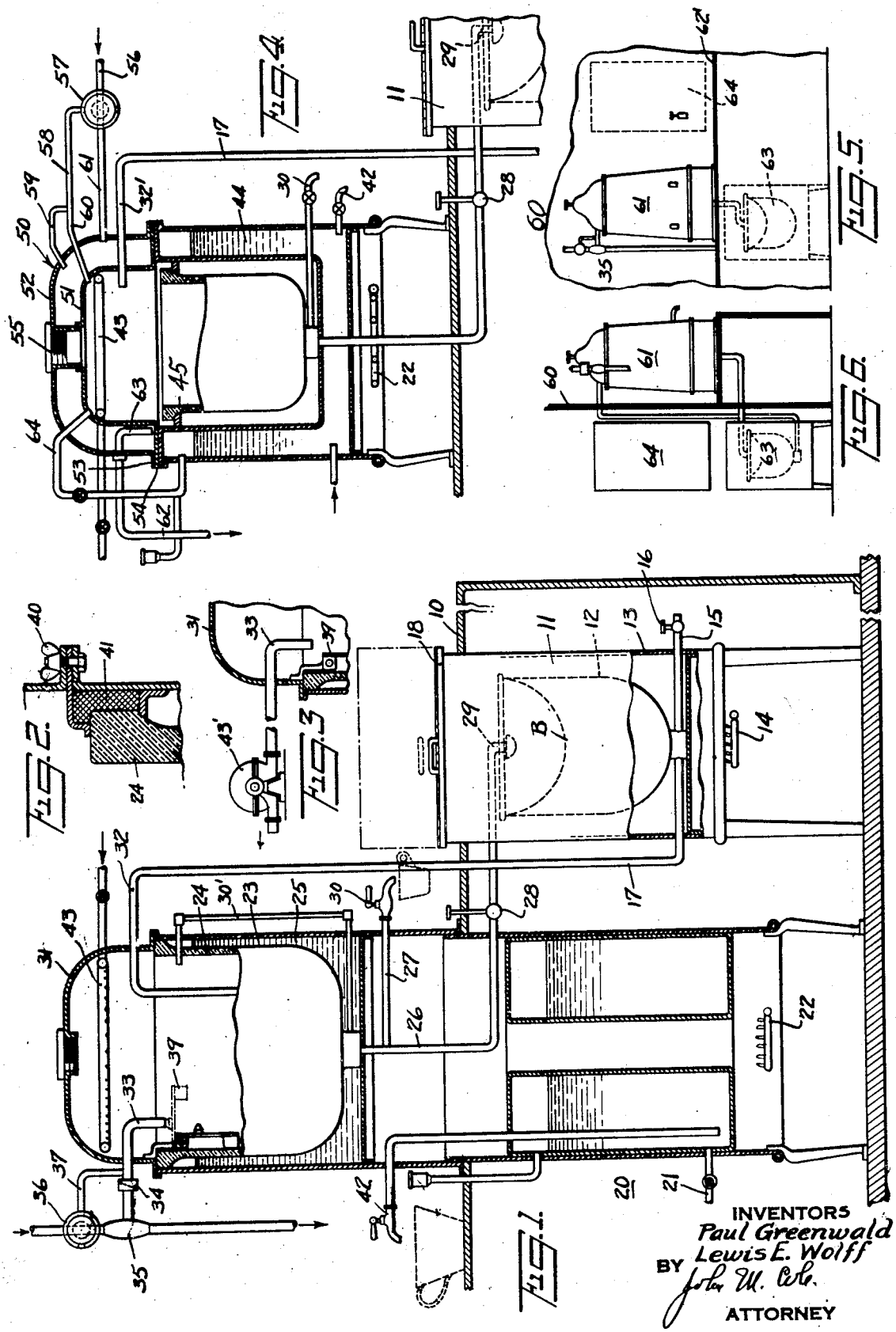

1,981,171

UNITED STATES PATENT OFFICE 1,981,171

COFFEE MAKING APPARATUS AND METHOD

Paul Greenwald and Lewis E. Wolff, Brooklyn, N. Y., assignors of one-fourth to Samuel Greenwald, Brooklyn, N. Y.

Application April 14, 1933, Serial No. 666,112

10 Claims. (Cl. 53—3)

The present invention relates to coffee making apparatus and methods and is more particularly directed toward improvements relating to the making of coffee extract in restaurants, lunch rooms, and the like where many persons are served.

In such places the typical coffee making apparatus employs either a single urn, a combination urn and boiler, or a boiler with one or two urns. These urns and the boiler (where it is employed), are placed above the working or counter level. They are either in the kitchen or are mounted on a service counter in view of the patrons. In the latter position they occupy very valuable space and require the attention of the attendant who is caring for the patrons.

Each urn consists of a water jacketed jar in which a supply of coffee extract is made by pouring through coffee grindings retained in a bag a measured amount of boiling water. To bring this extract to the requisite strength and secure evenness of strength throughout the entire extract, portions of the extract are drawn off from the bottom of the urn and repoured through the grindings, usually by a gallon measure. Owing to the fact that these urns are supported above the counter level, the covers are at an elevation above one's head. The cover for a large urn is so far above the floor that the attendant must climb up to reach or remove it. This makes it necessary to lift the boiling water above the head to pour it through the grindings, as well as to lift up the weak extract which is employed for repouring. There is always present the danger of scalding when handling this hot water or coffee extract, or in the renewal of the spent grindings. It is difficult or impossible for the attendant to look into the urn when placing the bag and grindings in place, or when washing the jar.

Various efforts have been made to provide automatic repouring coffee urns to avoid this handling of the boiling water, but these efforts have not been of much consequence commercially, on account of the expense, inherent difficulties of operation, and a lack of understanding by attendants.

The present invention is directed toward (1) the making of coffee in an urn placed below the counter level, whereby it is possible to look into the urn when placing the grindings bag in place, when pouring the boiling water over the grindings, and when cleaning the urn, and whereby the space heretofore occupied by the urn above the counter may be available for other purposes, and (2) the raising of the extract to a second urn placed above the counter level for repouring and/or service.

This general arrangement is capable of embodiment in a number of novel manners, each layout employing generally standard, well known, and easily understood forms of apparatus to which the suction producing means is applied.

Where the entire coffee making apparatus is to be installed as a unitary piece of restaurant equipment, the coffee making urn may be placed below the counter and the service urn above it. The service urn with associated suction devices may, in small installations, be embodied in a combination urn and boiler, while in larger installations the boiler may be placed below the counter level, preferably directly underneath the service urn so that the service urn may be heated from the same burner. It is also possible to install the boiler and coffee making urn in the kitchen where they can be attended to by a kitchen man while the waiter has only the service urn to attend to and valuable counter and shelf space is released for other purposes.

The invention contemplates various constructions whereby the weak extract or the completed extract is elevated to the service urn, suction for this purpose being made available by a water or steam operated aspirator, a suction pump, or by the condensation of steam in the closed service urn, or in any other suitable manner.

Other and further advantages of the invention will be pointed out hereafter.

The accompanying drawing shows, for purposes of illustrating the present invention, several embodiments in which the invention may take form, it being understood that the drawing is illustrative of the invention rather than limiting the same. In the drawing:

Fig. 1 is a sectional and more or less diagrammatic view illustrating a complete coffee making outfit designed as a unitary piece of restaurant equipment and wherein the suction for elevating the coffee is obtained by a fluid actuated suction pump;

Fig. 2 is a fragmentary sectional view showing a detail of construction of Fig. 1;

Fig. 3 is a fragmentary view illustrating the utilization of a mechanically operated air pump as the suction producing means;

Fig. 4 is a fragmentary view illustrating a modification of the structure of Fig. 1 arranged to employ a combination urn and utilize vacuum produced by condensation of steam for sucking up the coffee;

Fig. 5 is a diagrammatic view illustrating a layout adapted for making the coffee in the kitchen and serving it in the restaurant; and Fig. 6 is a diagrammatic elevational view of the arrangement shown in Fig. 5, taken from the left of said Fig. 5.

In the drawing, the counter level is indicated at 10. This is generally at a height of 34" above the floor. The coffee maker is illustrated at 11. This may be an ordinary water jacketed urn of the usual construction. The jar is indicated at 12, the wall of the water jacket at 13, and the heater at 14. This urn will, of course, be provided with the usual gauge to indicate the depth of water in the water jacket, and it may be provided with a gauge to indicate the depth of coffee in the jar. A drain pipe 15 with a drain cock 16 is connected to the bottom of the coffee maker and a second or suction pipe 17 is connected to the bottom of the coffee maker. This pipe leads up through the counter as indicated. The top of the coffee making urn may be closed by a jackknife cover indicated at 18.

A boiler is indicated at 20. This boiler is of the usual construction of tubular boiler customarily employed to supply boiling water under pressure for coffee making urns. It is adapted to be supplied with cold water from the supply means by a pipe indicated at 21 and heated by a burner indicated at 22. This boiler is placed below the counter level, as indicated, and mounted directly above this boiler is a service urn 23. It has a jar 24 and a water jacket 25 of the usual construction. The bottom of the upper urn is connected to pipes 26 and 27. The pipe 26 is provided with a valve 28 so as to deliver liquid into a spray head 29 carried above the coffee bag B in a coffee making urn. The pipe 27 is connected with cock 30 so that the contents of the upper urn may be drawn off. A gauge 30' is suitably connected into the service urn.

The service urn 23 is provided with a tight cover 31 through which the upper end 32 of the suction pipe 17 extends. As shown in the drawing, the cover 31 also carries an eduction pipe 33 which is connected through a check valve 34 with a water or steam operated suction or aspirator valve 35 of ordinary construction. The fluid supply for the valve 35 is controlled by a combination valve 36 having a water supply port and a vent port. The vent port is connected through a vent pipe 37 with the eduction pipe 33. The cover 31 carries a float valve 39 adapted to close off the end of the pipe 33 should the level of the liquid in the jar 24 become too high. The cover is removably clamped in place by bolts 40, and the space between the urn wall 25 and the jar closed by a gasket as indicated at 41.

The boiling water for making the coffee is obtained through a valve indicated at 42 and connected into the boiler in the usual way. One desiring to make coffee with the apparatus shown in Fig. 1, opens the cover 18 for the coffee making urn and places the requisite amount of coffee grindings in the coffee bag B. The valve 16 is closed and the desired amount of boiling water drawn off through the valve 42 and poured through the bag and grindings. Instead of a cloth bag, other forms of coffee filter may be employed. The cover may then be closed. The contents of the coffee making urn is coffee extract of varied strength according to the form of filter employed. Where a loosely woven bag is employed the extract is weak, but where a filter, such as customarily employed in making drip coffee is employed, the extraction is complete in a single pass. In either case the strength of the extract is not constant throughout the depth of the contents of the urn. The valves 28 and 30 are then closed and the valve 36 opened to allow the water or steam to pass through the valve 35. This will evacuate air from the jar of the service urn 24 and draw the coffee extract from the urn 11 up through the pipe 17 into the upper or service urn. The rapid flow of the fluid down into the pipe sets up a vortex action, whereby the contents of the urn starts whirling and the liquid withdrawn is taken from the top as well as from the bottom of the liquid mass so that the stratification of the liquid is destroyed with the result that the liquid is thoroughly mixed when delivered to the service urn. When this coffee extract has thus been elevated, (as determined by the gauge 30'), the valve 36 is closed, and this automatically opens the vent so that air can rush into the service urn.

If further strengthening is desired, the valve 28 is opened and the weak extract passed through the grindings. After the liquid has all run out of the upper urn, as determined by the gauge 30', the valve 28 may be closed and the valve 36 opened to evacuate the upper urn and suck up the coffee extract. As soon as the coffee maker is emptied, as may be determined by the gauge, the valve 28 is closed and the valve 36 opened. One can then serve the coffee from the upper urn through the valve 30. This valve, it will be noted, is above the counter level and at a convenient elevation for serving the coffee. The cover 18 may be opened, the spent grindings removed, and the coffee making urn washed out very easily. The operator can see what is being done and does not have to lift the wash water or grindings above the head.

A second batch of coffee may be made in the coffee maker either in the manner above described or by manually repouring so as to be ready for instant use in the service urn into which it can be sucked readily, as will be apparent.

A spray head is indicated at 43 in the top of the service urn. It is connected into the hot water supply so that wash water may be passed into the service urn without opening it up.

The arrangement of Fig. 3 contemplates the use of a motor driven air pump 43' for evacuating the urn. As there is no possibility of leakage of liquid into the urn, the check valve may be omitted, and the vent be in the pump.

In the form of construction shown in Fig. 4, a combination boiler and urn is employed with an arrangement for condensing steam to produce suction for lifting the coffee extract. The combination boiler and urn is of the usual form of construction, having a low pressure boiler 44 and jar 45, and is supported on the counter 46 as usual. Instead of having a loose cover for the jar, it is provided with a double walled cover 50 having an inner wall 51 and an outer wall 52. These walls are secured together by flanges 53 and 54 and preferably soldered or welded to form a tight joint. A tap screw 55 is also provided. The upper end 32' of the suction pipe 17 passes through both walls of the cover so as to discharge into the jar 45. A cold water supply pipe is indicated at 56 and a dual purpose valve for controlling the cold water and vent is shown at 57. The vent pipe 58 has one branch 59 which opens into the inside of the double walled cover and another branch 60 which extends through both walls of the cover and opens inside the service urn. When the valve 57 is closed, water passes through the pipes 56 and 61 into the double walled cover and fills this cover and flows out through a waste connection indicated at 62. This waste connection has an inner suction end 63 so as to drain out all the water after the valve 57 is turned to shut off the cold water and open the vent. A steam pipe 64 is provided with a valve 65 and passes from the upper part of the boiler through the urn cover 50 so as to discharge steam into the interior of the service urn. When the steam is thus discharged in the urn, or when steam is produced by the evaporation of the residual liquid in the jar 45, the air in the service urn is expelled through the vent.

When one desires to raise the coffee extract from the coffee maker up into the urn, the valves 65, 28, and 30 are closed, and the valve 57 manipulated to close the vent and allow the cold water to run through the urn cover 50. This chills the steam vapor and condenses it, thereby producing a partial vacuum so that the contents of the coffee maker is sucked up into the upper urn. So far as repouring and service is concerned, this arrangement operates the same as that shown in Fig. 1.

The arrangements shown in Figs. 1-4, inclusive, are intended to be embodied in a completed article of restaurant equipment so that the boiler, service urn, and coffee making urn may be combined with a suitable counter, doors, shelving, other dispensers such as milk and chocolate dispensers, and the like. Such a piece of apparatus may be manufactured, completed, tested and ready for installation in the restaurant, it being merely necessary to move it in place and connect up the cold water supply, the gas supply, and the waste.

The arrangements shown in Figs. 5 and 6 illustrate the possibility of installing the boiler and coffee maker in the kitchen and the service urn only in the restaurant, whereby available shelving and counter space is available in the restaurant which has heretofore been occupied by the boiler and battery of urns. In these figures the wall separating the restaurant from the kitchen is indicated at 60. The service urn is shown at 61 as being mounted on a counter 62'. This urn will be provided with the usual gas burner and with the control valve 35, or other means of producing the low pressure in the urn. The space to the side of this urn and underneath the counter is available for other uses. The coffee making urn is indicated at 63 and the boiler at 64. Both of these are placed in the kitchen where they can be attended to by a kitchen man. This makes it possible to relieve the waiter of the attention necessary for making the coffee. It makes it unnecessary to handle the coffee grindings in the restaurant or to open up the urns. It also eliminates the steam and heat which cannot be avoided when the urns and the boiler are in the restaurant.

It will, of course, be understood that the employment of a separate boiler and service urn, or a combination boiler and urn, will depend upon conditions, and that either of these may be used with any form of suction producing means. The arrangements herein shown make the production of high quality extract more certain, for, owing to the removal of the coffee extract from the lower urn, the bitter element in the grindings is not extracted by steaming.

A typical installation for a restaurant having one hundred fifty seats includes a twenty-four gallon boiler, two eight gallon urns, a hot milk urn, and a hot chocolate urn. As heretofore installed these required at least seven lineal feet of counter space. These may be replaced by an outfit such as shown in Fig. 1 occupying substantially less than four lineal feet of counter space of the same width. Inasmuch as one coffee maker may suffice for two service urns, an outfit having twice the capacity requires two boilers and two service urns and may be installed in 5' 6'' of counter space instead of about 11' 6'', heretofore required for the four urns, two boilers, a hot milk urn and a hot chocolate urn.

It is obvious that the invention may be embodied in many forms and constructions within the scope of the claims, and we wish it to be understood that the particular forms shown are but a few of the many forms. Various modifications and changes being possible, we do not otherwise limit ourselves in any way with respect thereto.

What is claimed is:

1. The method of making, mixing, and storing coffee extract, which comprises pouring boiling water through grindings in an elevated filter to make coffee extract which drains into a heated urn open to the atmosphere, and rapidly sucking the extract downwardly through an opening in the bottom of the urn and into a closed urn disposed at a higher elevation than the first urn and maintained substantially at the temperature of boiling water, the suction setting up a vortex action in the liquid whereby it is thoroughly stirred as it is sucked away and whereby it may be maintained hot but not boiling, for service.

2. The method of making, mixing, and storing coffee extract, which comprises pouring boiling water through grindings in an elevated filter to make coffee extract which drains into a heated urn open to the atmosphere, rapidly sucking the extract downwardly through an opening in the bottom of the urn and into a closed urn disposed at a higher elevation than the top of the first urn and maintained substantially at the temperature of boiling water, the suction setting up a vortex action in the liquid whereby it is thoroughly stirred as it is sucked away, disconnecting the suction and restoring the interior of the upper urn to atmospheric pressure, draining the weak coffee extract in the upper urn onto the grindings and into the first urn to strengthen the extract, repeating the suction operation to again stir and elevate the strengthened extract into the upper urn, and retaining it hot but not boiling for service at the higher elevation.

3. A coffee making apparatus comprising a water jacketed service urn mounted above the level of the usual counter and provided with a valve for the withdrawal of coffee extract at such level, the service urn having an airtight cover and being provided with a closable vent, means for producing a partial vacuum in the service urn, an open topped coffee making urn below the level of the bottom of the service urn, a coffee holding filter located in the upper part of said coffee making urn, and a suction pipe external of the coffee making urn and leading from the lower portion of the coffee making urn to the service urn, whereby, when the coffee extract is sucked from the coffee making urn to the service urn, agitation and mixing of said extract is effected.

4. Coffee making and storing apparatus comprising an open-topped, water-jacketed coffee making urn having a grindings receiving filter in the upper part thereof, the urn being disposed at a sufficiently low elevation to be below the working plane so that an operator may conveniently place the filter in the urn, pour water through the filter for extracting coffee, and inspect the interior of the urn; a water jacketed service urn having a closed top and provided with a closable vent; vacuum producing means associated with the service urn for reducing the pressure in the urn when the vent is closed; a downwardly extending suction pipe leading from the lower portion of the said coffee making urn to the inside of the service urn so that the coffee extract may be rapidly sucked up from the coffee making urn into the service urn thus thoroughly mixing the extract; and a service valve from the service urn at approximately the working plane, the service urn being adapted to store the coffee extract and the service valve being adapted to withdraw it for service when the vent is open.

5. A coffee making apparatus comprising a water jacketed service urn mounted above the level of the usual counter and provided with a valve for the withdrawal of coffee at such level, the service urn having an airtight cover and being provided with a closable vent; an open topped coffee making urn below the level of the bottom of the service urn, a grindings receiving filter in the upper part of the coffee making urn through which boiling water may be poured to extract the coffee essence; a downwardly extending suction pipe leading from the bottom of the coffee making urn to the inside of the service urn; a fluid operated aspirator connected into the service urn for evacuating air from the service urn when the vent is closed so that coffee extract from the coffee making urn may be rapidly sucked up into the service urn and simultaneously thoroughly mixed; and a valve controlled drain from the service urn to the top of the coffee making urn whereby, when the vent is opened, the stirred coffee extract aspirated up into the service urn may be repoured through the filter for strengthening and then sucked back up into the service urn for use, and again mixed.

6. A coffee making apparatus comprising a water jacketed service urn mounted above the level of the usual counter and provided with a valve for the withdrawal of coffee at such level, the service urn having an airtight cover and being provided with a closable vent, an open topped coffee making urn below the level of the bottom of the service urn, a grindings receiving filter in the upper part of the coffee making urn through which boiling water may be poured to extract the coffee essence, a downwardly extending suction pipe leading from the bottom of the coffee making urn to the inside of the service urn, means for introducing steam into the upper urn to blow out air, means for condensing this steam so that the pressure inside the service urn is reduced whereby coffee extract from the coffee urn may be rapidly sucked up into the service urn and simultaneously thoroughly mixed, and a service valve from the service urn at approximately the working plane, the service urn being adapted to store the coffee extract and the service valve being adapted to withdraw it for service when the vent is open.

7. In combination, a restaurant counter having two openings therein, a low pressure boiler mounted below the counter underneath one of the openings, a burner for heating the boiler, a coffee making urn having a water jacketed jar mounted below the other opening so that boiling water may be poured through the opening and through an elevated grindings receiving filter to make coffee extract which drains into the jar, a service urn mounted above the boiler so as to be heated from the boiler heating burner, the upper urn having an airtight cover and being provided with a closable vent, a suction pipe leading downwardly from the bottom of the coffee making urn and opening into the service urn, means for reducing the pressure in the service urn so that coffee extract is rapidly sucked up from the lower urn through said pipe into the upper urn and simultaneously thoroughly mixed.

8. An article of restaurant equipment comprising a service counter at the usual counter level, a low pressure steam boiler below the counter, a service urn supported over the boiler to be heated by waste heat therefrom and above the counter level, means to permit the usual discharge of the contents into a receptacle disposed above the counter, a coffee making urn mounted underneath the counter to one side of the boiler, the counter having an opening to permit access to the top of the coffee making urn, the coffee making urn being adapted to receive in the upper part thereof the usual grindings receiving filter so that boiling water may be poured through the counter opening and filter to make coffee extract, a downwardly extending drain pipe for the coffee making urn, the pipe extending upwardly into the service urn, the service urn having a jar, an airtight cover and a vent, a device for closing and opening the vent, and suction producing means for reducing the pressure in the service urn after the vent is closed so that the extract in the coffee making urn may be sucked rapidly up into the service urn and simultaneously thoroughly mixed.

9. An urn for coffee serving comprising a jar, a hot water jacket about the jar, an airtight cover for the top of the jar, a closable vent; an exhauster connected into the interior of the covered jar for exhausting air from the interior, means for starting the exhauster and closing the vent and for stopping the exhauster and opening the vent; a suction pipe leading from the interior of the urn to an extraneous source of coffee extract; and a coffee serving valve connected to the bottom of the jar so that coffee extract may be withdrawn from the urn when the vent is open.

10. An urn for coffee serving comprising a jar, a hot water jacket about the jar, an airtight cover for the top of the jar, a closable vent; an exhauster connected into the interior of the covered jar for exhausting air from the interior, means for starting the exhauster and closing the vent and for stopping the exhauster and opening the vent; a suction pipe leading from the interior of the urn to an extraneous source of coffee extract; a coffee serving valve connected to the bottom of the jar so that coffee extract may be withdrawn from the urn when the vent is open, and means operative when the level of the liquid exceeds a predetermined height for closing the connection with the exhauster so that the extract is not withdrawn thereby.

PAUL GREENWALD.
LEWIS E. WOLFF.